United States Patent [19]

Liu et al.

[11] 4,027,402
[45] June 7, 1977

[54] NOVEL EDUCATIONAL TOY

[76] Inventors: Hsing-ching Liu; Lan-dih Liu, both of 3F, No. 213, Chung Ching North Rd., Sec. 4, Taipei, China /Taiwan

[22] Filed: Apr. 2, 1976

[21] Appl. No.: 673,085

[52] U.S. Cl. .................................................. 35/9 R
[51] Int. Cl.² .......................................... G09B 3/02
[58] Field of Search ............. 35/9 R, 9 B, 9 C, 9 D, 35/48 R, 48 A

[56] References Cited
UNITED STATES PATENTS

| | | | |
|---|---|---|---|
| 407,128 | 7/1889 | Seyberth | 35/9 R |
| 1,629,635 | 5/1927 | Parsons | 35/9 R |
| 3,603,003 | 9/1971 | Ziegler | 35/9 D |

Primary Examiner—William H. Grieb

[57] ABSTRACT

A case and question and answer combination cards having notches in various depths on both longitudinal sides. Question setting and answer setting plates with releasable fixing levers and an indication mechanism is provided on the case. A pair of ropes extend between the card and the question setting and answer setting plates and are connected to the indication mechanism. The ropes are pressed by the plates against both notched sides of the card to determine a correct or incorrect answer in accordance with the depth of the notches. The results are indicated by the indication mechanism.

8 Claims, 6 Drawing Figures

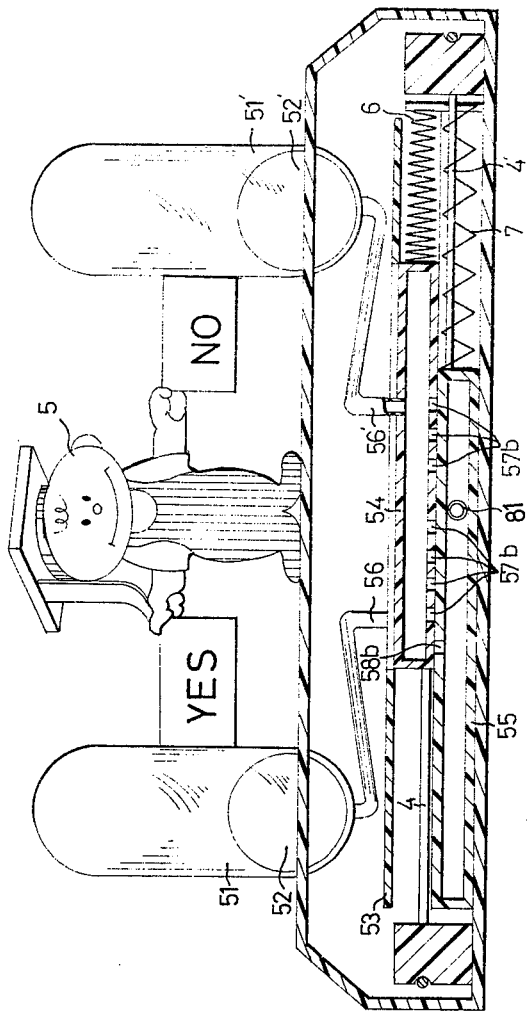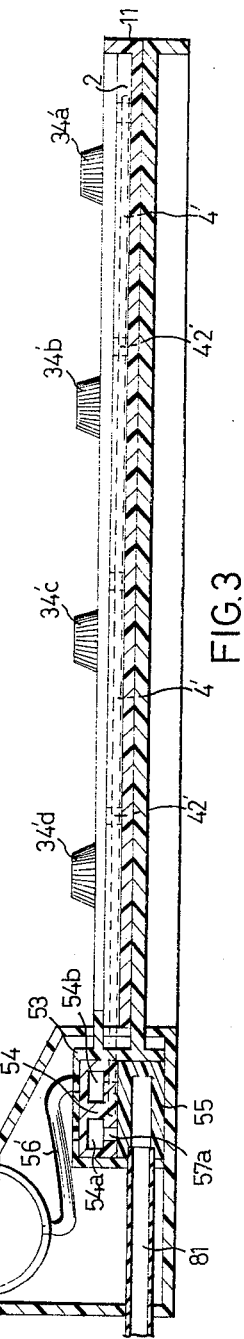

NOVEL EDUCATIONAL TOY

The present invention relates to a novel educational toy, and more particularly, to further improvement in the educational toy as disclosed in our co-pending applications Ser. Nos. 653,789; 613,519 and 602,964 filed Jan. 30, 1976; Sept. 18, 1975 and Aug. 8, 1975, respectively.

The novel educational toy according to the present invention comprises a case, a plurality of changeable question and answer combination cards having notches in various depths from both longitudinal sides thereof, a series of question setting means with respective releasable fixing means, a series of answer setting means with respective releasable fixing means, an indication mechanism to indicate either an affirmative or a negative answer is made, a pair of ropes extending along the longitudinal direction between a card and said question setting means as well as said answer setting means, respectively, and connecting to said indication mechanism, thereby the said rope will be separately pressed by said question setting means and answer setting means against both said notched sides of said card to determine the answer either affirmative or negative in accordance with corresponding depths of said notches pressed against from said both setting means, so that the result will be indicated by said indication mechanism.

It is, accordingly, the main object of the present invention to provide an aforementioned educational toy of novel construction.

Other objects and advantages will become apparent from the following description with reference to the accompanying drawings, in which:

FIG. 3 is a longitudinal cross section along the line III—III of FIG. 2;

FIG. 4 is a transverse cross section along the line IV—IV of FIG. 2;

Figure 1:
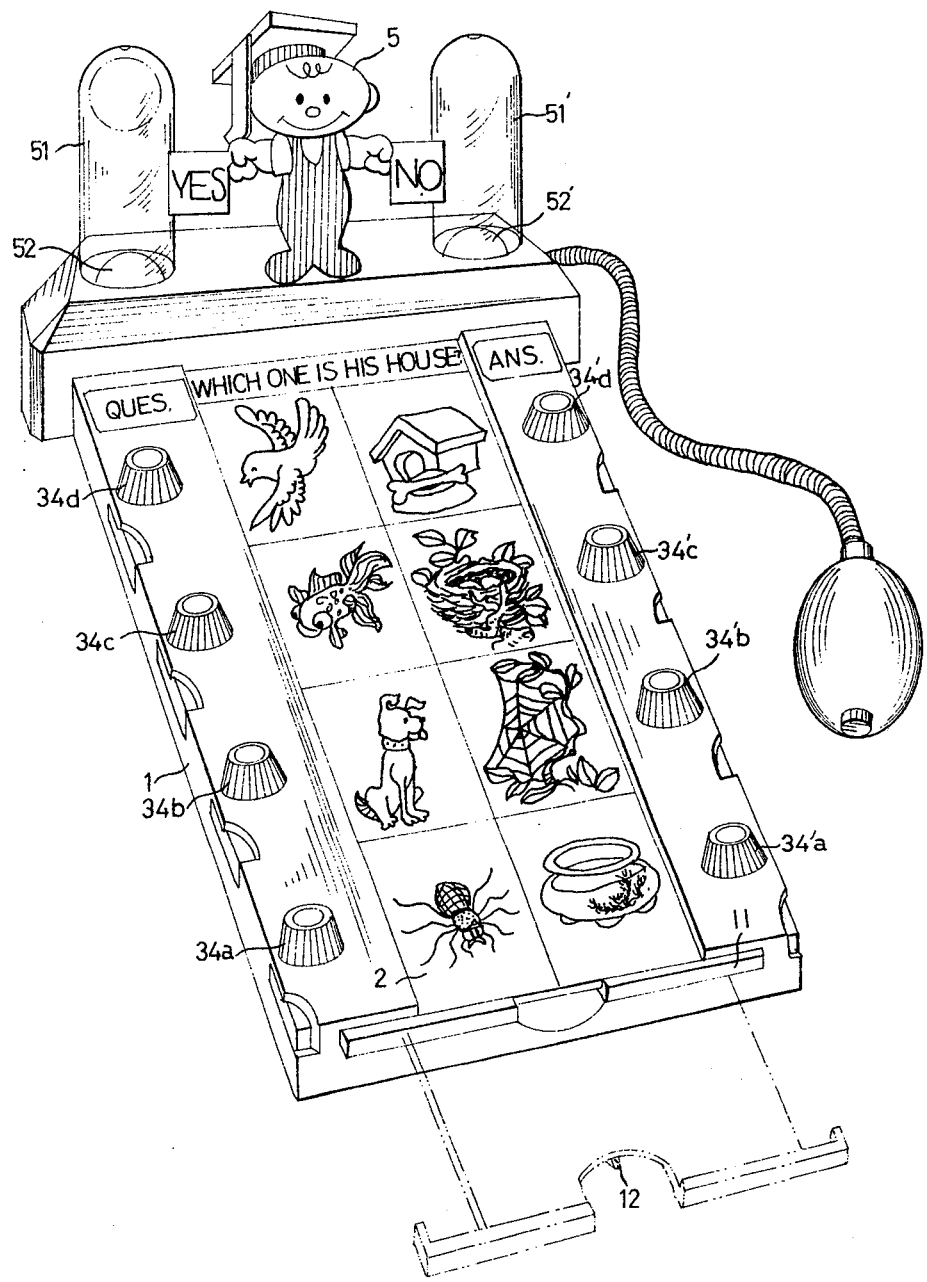
FIG. 1 is a perespective view of first preferred embodiment according to the present invention.

Now, with reference to FIGS. 1 to 4 of the drawings, first embodiment of the novel educational toy according to present invention mainly comprises a case 1, a question and answer combination card 2, a series of question setting means 3a to 3d, a series of answer setting means 3'a to 3'd, a pair of ropes 4 and 4', and an indicator 5.

The case 1, as shown in FIG. 1, has an elongated box configuration, but other variable types are also available, it is not necessary being limited to the illustrated model. The case 1 provides a drawer 11 which can be drawn out, as indicated by the dash line, for placing the card 2 thereon. The said drawer 11 has a longitudinal extended guide rib 12 to mate with a groove (not shown) on the bottom of case 1. At the inner end of the drawer 11, there is a positioning protrusion 13 (FIG. 2) to mate with a recess on the card 2 for the aid of positioning the card 2.

Figure 2:
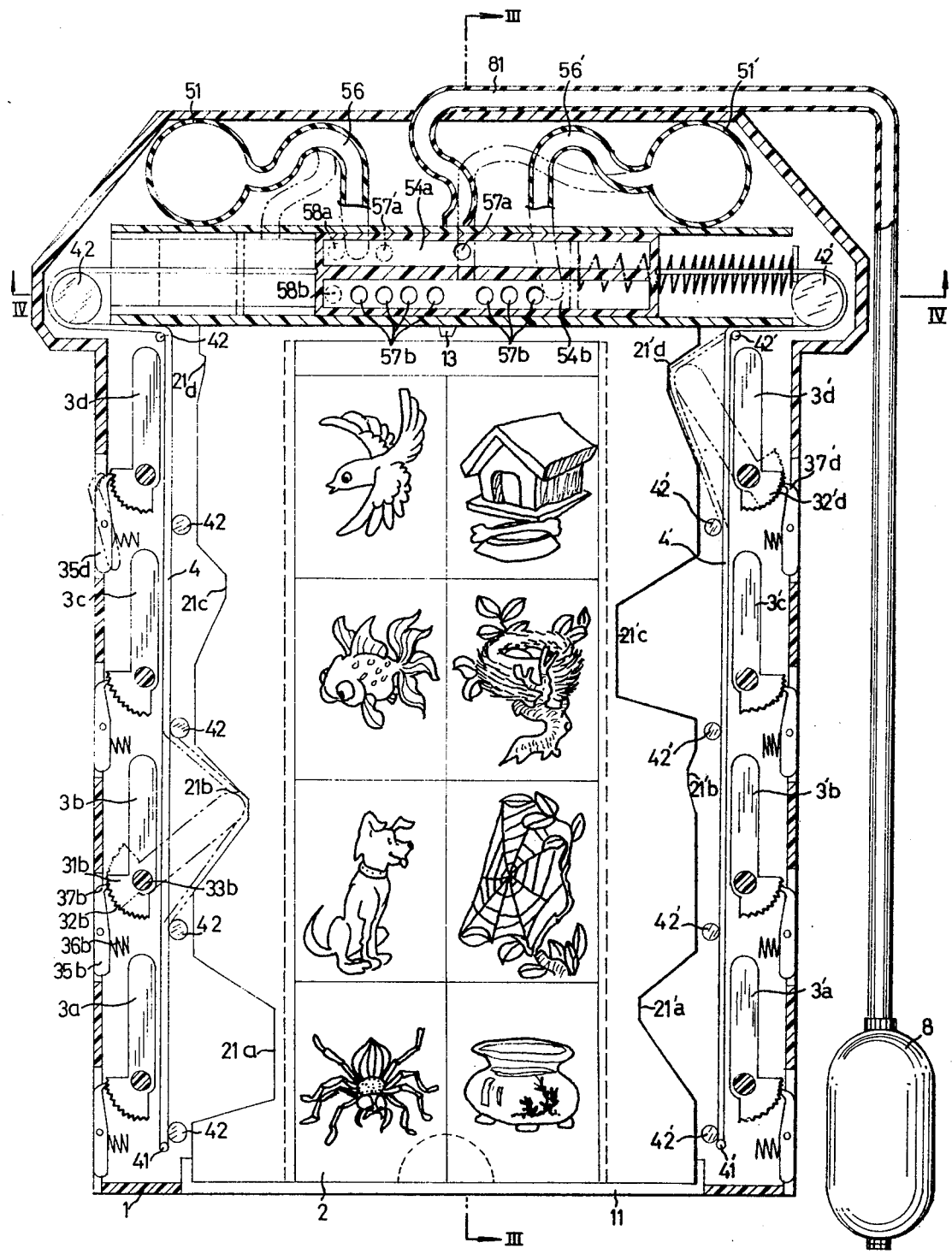
FIG. 2 is a top view with partial cross section of FIG. 1.

The question and answer card 2 is removably placed on the drawer 11 then pushed into the place as illustrated. The card 2 as shown is only one of the unlimited variation, each of which is well designed and printed with a number of questions, for example, at left column, and corresponding answers, at right column. The said questions and answers may be expressed by means of illustration, character, mathematic calculation etc. The card 2, as best shown in FIG. 2, has notches 21a to 21d and 21'a to 21'd with different depths from both longitudinal sides of the card 2. For example, the depths of the notches 21d and 21'b designated as one scale, 21c and 21'd as two scales, 21b and 21'a as three scales and 21a and 21'c as four scales.

Both the question setting means 3a to 3d and answer setting means 3'a to 3'd are in the form of elongated plates arranged along both longitudinal sides of the case 1. Take the question setting means 3b for example, as well as other setting means including 3a to 3d and 3'a to 3'd, the elongated plate 3b is provided at one end with a sector 31b having a plurality of teeth 32b at the peripherial outer rim thereof. The elongated plate 3b is connected by means of a shaft 33b to a knob 34b arranged on the case 1. The plate 3b can be turned by operating the knob 34b and is associated with releasable fixing means 35b which is in the form of pivotable lever biased by a compression spring 36b. The fixing means 35b has an inwardly hooked tooth 37b meshed with said teeth 34b of the sector 33b.

The ropes 4 and 4' are secured at one end on a stud 41 and 41', respectively, extended therefrom along the longitudinal direction between said card 2 and said question setting means 3a to 3d as well as said answer setting means 3'a to 3'd, passing by a plurality of guide rods 42 and 42' and secured at other end to slidable chambers 54 and 55, respectively.

The indication mechanism comprises a pair of top closed hollow transparent columns 51 and 51' each receiving a floatable small balloon 52 and 52', and a transverse housing 53, in which a pair of superposed chambers 54 and 55 are contained. The upper chamber 54 is divided into two compartments 54a and 54b, wherein the rear compartment 54a is communicated to the column 51 via a flexible tube 56 and has only one opening 57a on bottom, while the front compartment 54b is communicated to another column 51' via another flexible tube 56' and has a plurality of openings 57b in series on bottom provided that the position corresponding to said only one oening 57a is blocked. The upper chamber 54 is connected with the rope 4 at one end and biased by a tension spring 6 at the other end. Provided with two openings 58a and 58b in parallel on top, the lower chamber 55 is connected with the rope 4' at the one end and biased by a compression spring 7 at same end or by a tension spring (not shown) at the other end. The said lower chamber 55 is communicated with an air source, such as, a resilient air pump 8 via a flexible tube 81. The said chamber 54 and 55 are slidable with respect to each other within the housing 53.

In operation, one first of all draws out the drawer 11 and selects one card 2 to place thereon mating the recess on the card 2 with the protrusion 13, then pushes the drawer 11 into place.

Now, in order to answer the question, for example, "Which one is his house?" on card 2 as illustrated, suppose one turns the knob 34b making the question setting means 3b to press against the rope 4 into the notch 21b of three scales and fixed by meshing of the hooked tooth 37b with teeth 32b. At this time, the upper chamber 54 is pulled leftwards by the rope 4 to an extent corresponding to three scales as shown by dotted-and-dash line in FIG. 2, namely, the position of opening 57a is displaced to that as shown by imaginary opening 57'a.

Subsequently, when one turns the knob 34'd making the answer setting means 3'd to press against the rope 4' into the notch 21'd of two scales and fixed by meshing of the hooked tooth 37'd with teeth 32'd, at the same time, the lower chamber 55 is pulled rightwards by the rope 4' to an-extent corresponding to two scales as shown by dotted line in FIG. 2, namely, the position of opening 58a is displaced to that identical at 57'a. So that, the opening 58a communicates with the opening 57a, while the opening 58b is blocked. Then squeeze the pump 8. The air will be passed through lower chamber 55, opening 58a, opening 57a rear compartment 54a, tube 56, into column 51 to blow the balloon 52 up, as indicated by the dash line in FIG. 1. Thus, the affirmative answer "Yes" is indicated by the indicator 5.

On the contrary, when any one of the knobs 34'a, 34'b and 34'c is turned, the lower chamber 55 will be displaced other than two scales, that means, the opening 58a will not communicate with the opening 57a, while the opening 55b will comunicate with any one of the openings 57b. So that when the pump 8 is squeezed, the balloon 52' inside the column 51' will be blown up to indicate a negative answer "No" by the indicator 5.

When the fixing means 35b is pressed down, as shown by the status of 35d, against the spring 36b to release the setting means 3b, the upper chamber 54 will be pulled back by the tension spring 6 to its original position thereby the rope 4 will be tensioned to make the setting means 36 return to its original position. Similar operation is also made to release the answer setting means 3'd. Then a new quiz procedure can be repeated as mentioned above.

Figure 6:
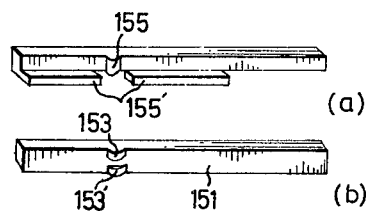
FIGS. 6a and 6b are perspective views of the nonconducting bars.
Figure 5:
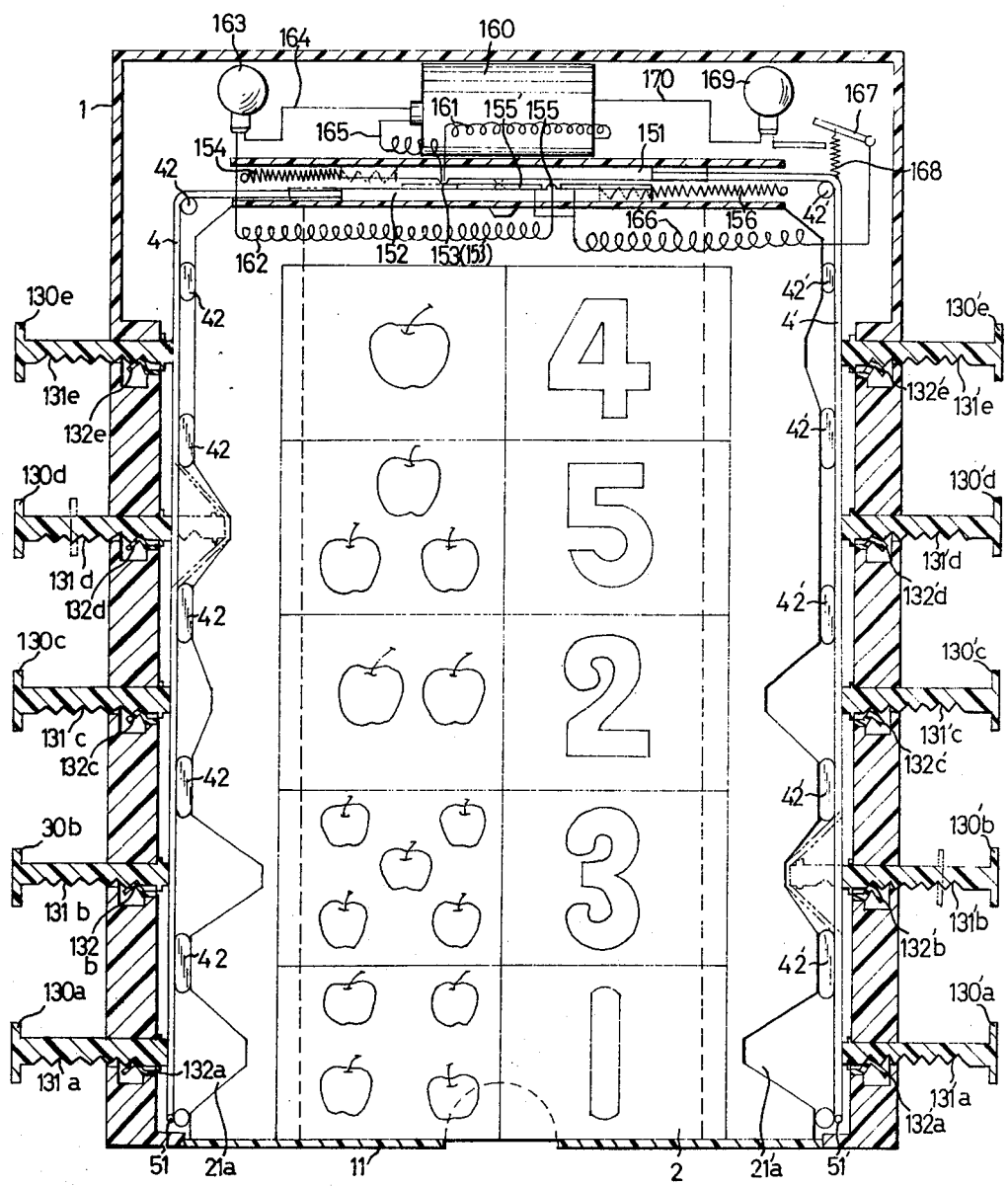
FIG. 5 is a top view with partial cross section of second embodiment according to the present invention.

FIGS. 5 and 6 illustrate a second embodiment according to the present invention. For simplification, the same symbols are indicated to show the members similar to the first embodiment, and the description of such members will be omitted.

It is apparent from this embodiment in comparison with the first embodiment that the question and answer setting means 130'a to 130'e and 3'a to 3'e are in the form of a push rod provided with a plurality of recesses 131a to 131e and 131'a to 131'e which are associated with a spring trigger 132a to 132e and 132'a to 132'e respectively, as fixing means.

The indication mechanism comprises a pair of nonconducting bars 151 and 152. The rear bar 151, as best shown in FIG. 6b, is provided with two inwardly protruded conducting points 153 and 153' in parallel at upper and lower ends. The said bar 151 is connected to the rope 4' at one end and biased by a tension spring 154 at the other end. The front bar 152 is provided with an inwardly protruded conducting point 155 at its upper end and an inwardly protruded conducting strip 155' at its lower end, or vice versa, while the strip 155' is interrupted at the place corresponding to said conducting point 155, as best shown in FIG. 6a. The said bar 152 is connected to the rope 4 at one end and biased by a tension spring 156 at the other end.

The conducting point 153 is electrically connected to one terminal of a power source, such as, a dry cell 160 by the wire 161, while the conducting point 155 is electrically connected by wire 162 to one terminal of affirmative signal lamp 163 which is in turn electrically connected at another terminal to the other terminal of dry cell 160 by wire 164. On the other hand, the conducting point 153' is electrically connected to another terminal of the dry cell 160 by wire 165, while the conducting strip 155' is electrically connected by wire 166 to one terminal of switch 167. The switch 167 is normally off and may be switched on by the tension of a spring 168, which is engaged with rope 42', to be electrically connected to one terminal of negative signal lamp 169 upon the operation of rope 4'. The lamp 169 is electrically connected to one terminal of the dry cell 160 by wire 170. Thus two separate circuit systems are constructed.

In operation, when the question setting means 130d is pressed in three scales and fixed by the trigger 132d in corresponding recess 131d, the front bar 152 will be pulled by rope 4 leftwards for a distance corresponding to three scales. Subsequently, when the answer setting means 130'b is pressed in three scales and fixed by the trigger 132'b in corresponding recess 131b too, then the rear bar 151 will be pulled by rope 4' rightwards for a distance corresponding to three scales. At this time, the conducting point 155 is in contact with the conducting point 153, and the affirmative circuit system including wires 161, 162 and 164 is energized, so that the lamp 163 is lighted to indicate that an affirmative answer is made. On the contrary, when any one of the other answer setting means 130'a and 130'c to 130'e is pressed, it results that the conducting point 153' is in contact with conducting strip 155', and the negative circuit system including wires 165, 166, 170 and switch 167 is energized, so that the lamp 164 is lighted to indicate a negative answer is made.

The above embodiments are given only for illustrative purpose and not by the way of limitation. Any variations and modifications evident to those skilled in the art will fall within the scope of the attached claims.

What we claim is:

1. An educational toy comprising a case, a plurality of changeable question and answer combination cards having notches in various depths from both longitudinal sides thereof, a series of question setting means with respective releasable fixing means, a series of answer setting means with respective releasable fixing means, an indication mechanism to indicate either an affirmative or a negative answer is made, a pair of ropes extending along the longitudinal direction between a card and said question setting means as well as said answer setting means, respectively, and connecting to said indication mechanism, thereby the said ropes will be separately pressed by said question setting means and answer setting against both said notched sides of said card to determine the answer either affirmative or negative in accordance with corresponding depths of said notches pressed against from said both setting means, so that the result will be indicated by said indication mechanism.

2. The educational toy as set forth in claim 1, wherein the case is provided with a drawer for placing the said card thereon.

3. The educational toy as set forth in claim 1, wherein both the question setting means and answer setting means are in the form of an elongated plate which is provided at one end with a sector having a plurality of teeth on a peripherial outer rim thereof.

4. The educational toy as set forth in claim 3 wherein the fixing means are in the form of pivotable levers each biased by a spring, one end of the fixing means has an inwardly hooked tooth meshed with said teeth on said sector of said setting means.

5. The educational toy as set forth in claim 1, wherein both setting means are in the form of a push rod which is provided with a plurality of recesses in series on the stem thereof.

6. The educational toy as set forth in claim 5, wherein the fixing means is a spring trigger.

7. The educational toy as set forth in claim 1, wherein the indication mechanism consists of a pair of top closed hollow columns each receiving a floatable small balloon, and a pair of superposed chambers slidable with respect to each other, in which the upper chamber is divided into two compartments, one of which is communicated to one of said columns and has only one opening on bottom, while another compartment is communicated to said other column and has a plurality of openings in series on bottom provided that the position corresponding to said only one opening of said one compartment is blocked, and the lower chamber communicated with an air source is provided with two openings in parallel on top.

8. The educational toy as set forth in claim 1, wherein the indication mechanism consists of circuit means and a pair of non-conducting bars, one of which is provided with two inwardly protruded conducting points in parallel at upper and lower ends, and another bar is provided with an inwardly protruded conducting point at either end of upper and lower ends while an inwardly protruded conducting strip at opposite end and interrupted at the place corresponding to said conducting point.

* * * * *